United States Patent [19]

Wickham et al.

[11] 3,887,241

[45] June 3, 1975

[54] BRAKE CYLINDER RELEASE VALVES

[75] Inventors: David John Wickham; Jack Washbourn; Philip Norman Paginton, all of London, England

[73] Assignee: Westinghouse Brake & Signal Co. Ltd., London, England

[22] Filed: Feb. 19, 1974

[21] Appl. No.: 443,747

[52] U.S. Cl. .................................. 303/68; 303/80
[51] Int. Cl. ........................................... B60t 15/02
[58] Field of Search ............ 303/68, 70, 71, 80, 81, 303/69, 35

[56] References Cited
UNITED STATES PATENTS

| | | | |
|---|---|---|---|
| 2,490,999 | 12/1949 | Sexton | 303/68 |
| 2,635,925 | 4/1953 | Wade | 303/80 |
| 2,725,261 | 11/1955 | Pickert et al. | 303/68 |
| 2,886,377 | 5/1959 | Martin | 303/68 |
| 3,378,311 | 4/1968 | Wright, Jr. | 303/69 |
| 3,707,314 | 12/1972 | Paginton | 303/69 X |

*Primary Examiner*—Trygve M. Blix
*Assistant Examiner*—Douglas C. Butler
*Attorney, Agent, or Firm*—Larson, Taylor & Hinds

[57] ABSTRACT

A brake cylinder release valve for use between a brake cylinder and a fluid operable brake control valve such as a triple valve has a pressure input port communicating with output port for connection to a brake cylinder, the output port being connected via a restriction to one side of a pressure responsive member, to the other side of which the input port is connected, and a vent valve operable to vent the one side of the pressure responsive member which is thereby caused to move to operate a valve which vents the output port and closes the communication between the ports.

3 Claims, 1 Drawing Figure

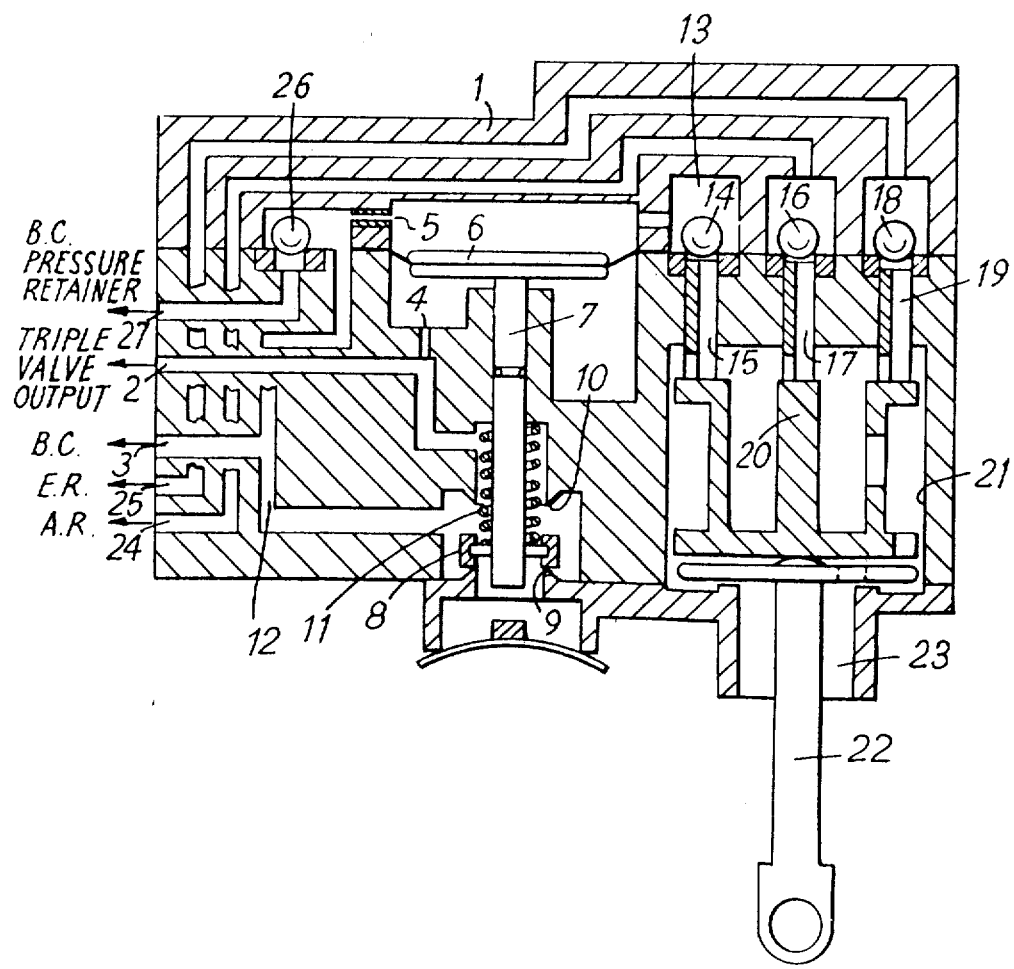

3,887,241

BRAKE CYLINDER RELEASE VALVES

This invention relates to brake cylinder release valves and relates especially to a release valve for use in a fluid operable brake control valve apparatus.

Various aspects of a fluid operable brake control valve apparatus are described and claimed in the specification of British Pat. No. 1,306,708. This specification describes in general a type of fluid operable brake control valve apparatus which has brake cylinder inlet and exhaust valves for controlling the supply of fluid pressure into and out of a brake cylinder, said valves being operable by a pressure responsive member movable in response to changes of pressure applied to a brake pipe relative to an auxiliary reservoir pressure to apply via the brake cylinder inlet valve fluid pressure from the auxiliary reservoir to the brake cylinder.

With such apparatus it can be a requirement to provide a brake cylinder release valve which is operable, independently of control of brake cylinder pressure by the supply of fluid pressure into and out of the brake pipe, to enable release of pressure from the brake cylinder by an alternative means such as a manually operable lever.

According to the present invention, there is provided a brake cylinder release valve for interposing between a brake cylinder and a fluid operable brake control valve and including a fluid pressure input port and a fluid pressure output port, the input port communicating with the output port and with one side of a pressure responsive means and via a fluid flow restriction to the other side of the pressure responsive means and with a normally closed vent valve, the pressure responsive means being coupled to a further valve means such that in operation opening of the vent valve causes movement of the pressure responsive means to operate the further valve means to close the communication between the input and output ports and vent the output port.

BRIEF DESCRIPTION OF THE DRAWING

In order that the invention may be more clearly understood and readily carried into effect, the same will be further described by way of example with reference to the accompanying drawing which illustrates a preferred embodiment of a brake cylinder release valve in accordance with the invention.

DESCRIPTION OF THE PREFERRED EMBODIMENT

The valve comprises a main body denoted by reference 1 having an input port 2 for connection to the output of a controlling triple valve and an output port 3 for connection to a brake cylinder. The input port is connected via a port 4 to one side of a pressure responsive member 6 mounted on a stem 7 which is sealingly slideable in the main body and carries at its lower end a valve member 8 of a valve means which in its lowermost position seals off a way through a seat 9 and in its uppermost position seals off a way through a seat 10. The valve means is urged to its lowermost position by a spring 11.

The other side of the pressure responsive member 6 is connected via a fluid flow restriction 5 and passage 12 to the output port 3; also through a way beside the stem 7 to the inlet port 2. The said other side of the pressure responsive member 6 is further connected to a chamber 13 in which is housed a ball vent valve 14 which is normally closed but can be unseated by a sliding member 15 to provide a passage between the said other side of the pressure responsive member and atmosphere.

Two ball valves similar to the ball valve 14 are denoted by references 16 and 18. These valves are also normally closed and can be unseated by push-rods 17 and 19 respectively. The push-rods 15, 17 and 19 are all operable by a plunger 20 which is housed in a cylindrical section 21 of the housing and in turn is operable by a rockable lever 22 which projects from the body of the release valve through an aperture 23. The rod 19 is somewhat shorter than rods 15 and 17 so that a greater movement of lever 22 is required to operate the valve 18. The valves 16 and 18 are in chambers which are connected to respective further ports denoted by references 24 and 25 and these are connected in operation to the auxiliary reservoir and the emergency reservoir respectively of a fluid pressure brake control valve apparatus. It may be noted also that the end of push-rod 19 is slightly further spaced from the plunger 20 than are the push-rods 15 and 17 such that a greater movement of the lever 22 is required in order to unseat the ball valve 18.

The apparatus also includes a check valve denoted by reference 26 which normally seals a communication between restrictive passage 5 and a further port 27 which latter port is connected to a brake cylinder pressure retainer when provided.

In operation of the apparatus, the valve is used with an apparatus similar to that described in the above mentioned patent specification. It is assumed that it is connected with the ports 2, 3, 24, 25 and 27 connected as indicated above and that a rail vehicle carrying a brake control triple valve apparatus to which the release valve is connected, has had its brake pipe pressure reduced such as to park the vehicle with the brakes applied. That is, the brake pipe reduction has been such as to cause the application of auxiliary reservoir pressure via the triple valve to the input port 2 and via the port 2 and the way past the stem 7 and the passage 12, to the port 3 and to a brake cylinder. Under a steady condition, the pressure is thus equalised on both sides of the pressure responsive member 6 and the bias which is imposed by the spring 11 is sufficient to maintain the valve member 8 in its lowermost position sealing off the passage between the output port and atmosphere via the seat 9. In the event that an operator wishes to release the brakes, a brief deflection of the lever 22 causes the push-rod 15 to unseat the ball valve 14 and therefore vent a small amount of fluid pressure from the upper side of the pressure responsive member 6 to atmosphere via the unseated ball valve 14 and the opening 23. Since there is a restriction 5 between the two sides of the pressure responsive member 6, the resultant brief reduction of pressure above the pressure responsive member 6 causes the pressure responsive member 6 to rise and thus unseat the valve member 8 from the seat 9 further reducing the pressure above the pressure responsive member and venting the brake cylinder to atmosphere. The valve member 8 is thus seated by the pressure difference across the pressure responsive member against the upper valve seat 10 and the passage between the input port 2 and the output port 3 is closed. Accordingly, the brake cylinder is vented with negligible loss of fluid pressure via the input port 2 from the brake control valve apparatus. The brakes are thus released and the vehicle may be moved as required whilst still retaining the existing fluid pressures in the remaining part of the system.

It may be noted that the length of the push-rod 17 is substantially the same as that of the push-rod 15 and thus a brief deflection of the lever 22 also unseats the ball valve 16 to dissipate a small amount of auxiliary reservoir pressure to atmosphere via the opening 23.

If the triple valve is lapped off in a condition in which the brake pipe pressure is substantially equal to auxiliary reservoir pressure, with the brake applied with a small brake pressure, the drop of auxiliary reservoir pressure produced by the operation of lever 22 initiates a release operation by the triple valve. This releases the brakes and prevents sufficient pressure from being claimed above the member 6 so that the release valve even if briefly deflected, reverts to its normal position in readiness for the next application of the brakes by the triple valve.

If the triple valve in another instance has remained in the applied condition due to excessive trapped auxiliary reservoir pressure after a greater brake application the operation of lever 22 to vent the auxiliary reservoir pressure will again allow the brake pipe pressure to predominate over the auxiliary reservoir pressure and reset the triple valve to the release condition which again ensures that the release valve settles to the condition shown in readiness for the next application.

In many forms of fluid operable brake control valve apparatus, a brake cylinder pressure retainer is provided by means of which the pressure in the brake cylinder can be retained at a given pressure set by a spring-loaded check valve in the brake cylinder exhaust path and which can be rendered effective as required by a lever. Such a retainer enables a steady braking facility regardless of the normal operation of the brake control valve apparatus to select a lower value. In the event that this retainer is maintained in the retained pressure condition when the release valve lever 22 is operated, it would ordinarily not be possible to release the pressure responsive member 6 from its uppermost position owing to the presence of a retained pressure at the input port 2 and therefore on the underside of the pressure responsive member 6. For this reason, the check valve 26 is provided to enable a bypass to be included around the retainer. In this way, the retained pressure can be dissipated via the port 27 and the check valve 26 into the passage 12 which at the material time is vented to atmosphere via the opened valve seat 9. Thus the retainer is only effective when the way through 8 and 9 is closed.

If it is required to release all the fluid pressure retained in the fluid operable control valve apparatus, the release valve lever 22 may be deflected by the operator for a greater length of time and over a greater distance. In this case, not only valves 15 and 16 but also valve 18 is unseated for a protracted interval and the auxiliary reservoir pressure and the emergency reservoir pressure are both dissipated via the unseated valves 16 and 18 to atmosphere via the opening 23. It will be readily apparent to the operator when a total release of both these reservoirs has been attained.

Having thus described our invention what we claim is:

1. A brake cylinder release valve device for interposing in a fluid path between a brake cylinder and a fluid operable brake control valve and operable to close said path and vent the brake cylinder, said release valve device comprising a fluid pressure input port for connection to a control valve and a fluid pressure output port for connection to a brake cylinder, a pressure difference responsive member, a vent communicable with said output port, valve means operable by said pressure responsive member for normally opening the passage between said input and output ports and closing said vent, a relatively restricted fluid connection between said output port and one side of said pressure responsive member but clear of the flow path from said output port to said vent, a relatively less restricted fluid connection between said input port, said vent and the other side of said pressure responsive member, and a manually operable vent valve connected to said one side of said pressure responsive member for venting said one side and reversing the state of said valve means when sufficient pressure exists at the input port to move said pressure responsive member, whereby to close the passage between said input and output ports and open said vent to said output port.

2. Apparatus as claimed in claim 1 further comprising a second vent valve for venting a control valve auxiliary reservoir pressure, and a manual actuator for actuating both said vent valve and said second vent valve.

3. Apparatus as claimed in claim 1 further comprising a second vent valve for venting a control valve emergency reservoir, and a manual actuator for opening both said vent valve and said second vent valve.

* * * * *